(12) United States Patent
Lee

(10) Patent No.: US 9,757,873 B2
(45) Date of Patent: Sep. 12, 2017

(54) BOARD STRUCTURE FOR MANUFACTURING CONCRETE PRODUCTS

(71) Applicant: SAMJUNG INDUSTRIES CO., LTD., Gyeongsangbuk-do (KR)

(72) Inventor: Hi-Man Lee, Gyeongsankbuk-do (KR)

(73) Assignees: Hi-Man Lee, Pohang-si, Gyeongsangbuk-do (KR); SAMJUNG INDUSTRIES CO., LTD., Pohang-si, Gyeongsangbuk-do (KR)

( * ) Notice: Subject to any disclaimer, the term of this patent is extended or adjusted under 35 U.S.C. 154(b) by 57 days.

(21) Appl. No.: 14/713,392

(22) Filed: May 15, 2015

(65) Prior Publication Data

US 2015/0360388 A1    Dec. 17, 2015

(30) Foreign Application Priority Data

Jun. 11, 2014    (KR) ........................ 10-2014-0071014

(51) Int. Cl.
| | | |
|---|---|---|
| *B28B 1/08* | (2006.01) | |
| *B28B 7/00* | (2006.01) | |
| *B32B 3/28* | (2006.01) | |
| *B32B 7/04* | (2006.01) | |
| *B32B 13/02* | (2006.01) | |

(52) U.S. Cl.
CPC .............. *B28B 1/08* (2013.01); *B28B 7/0055* (2013.01); *B32B 3/28* (2013.01); *B32B 7/045* (2013.01); *B32B 13/02* (2013.01); *B32B 2307/10* (2013.01); *B32B 2307/712* (2013.01); *B32B 2307/714* (2013.01); *B32B 2419/00* (2013.01)

(58) Field of Classification Search
CPC ........... E28B 1/08; B23B 7/045; B32B 13/02; B32B 3/28; B28B 7/0055; E04C 2/34; E04C 2002/3488; E04C 2/36
See application file for complete search history.

(56) References Cited

U.S. PATENT DOCUMENTS 1,377,891 A *   5/1921   Knight .................... E04C 3/122
                                                     52/841
3,012,639 A *   12/1961   Pavlecka ............... E04B 1/6158
                                                     52/275
3,828,502 A *   8/1974   Carlsson .................. E04B 1/14
                                                     52/125.4
(Continued)

FOREIGN PATENT DOCUMENTS

| JP | 06-51284 B2 | 7/1994 |
|---|---|---|
| KR | 20-0331597 Y1 | 10/2003 |

(Continued)

*Primary Examiner* — Adriana Figueroa
*Assistant Examiner* — Jessie Fonseca
(74) *Attorney, Agent, or Firm* — Rabin & Berdo, P.C.

(57) ABSTRACT

Disclosed is a board structure for manufacturing concrete products, wherein a board used to manufacture a concrete product, for example, concrete blocks, paving stones, etc. is formed of an upper layer and a lower layer, and a side support frame connecting the upper layer and the lower layer, so it does not need to manufacture molds for each size, and a portion that receives external weight during the manufacturing of concrete products can be reinforced, thus obtaining substantial strength and lightness, and the manufacturing does not cost a lot while reducing noises during the manufacturing of concrete products.

16 Claims, 13 Drawing Sheets

(56) References Cited

U.S. PATENT DOCUMENTS

| | | | | |
|---|---|---|---|---|
| 4,329,827 | A | * | 5/1982 | Thorn ........................ E04B 7/22 52/790.1 |
| 4,456,497 | A | * | 6/1984 | Eberle .................. B27M 3/0026 144/352 |
| 6,848,233 | B1 | * | 2/2005 | Haszler ................ B23K 20/122 148/440 |
| 8,955,290 | B2 | * | 2/2015 | Saff .......................... B32B 3/06 52/404.2 |
| 2004/0068949 | A1 | * | 4/2004 | Richards .................. B32B 3/20 52/334 |
| 2009/0277120 | A1 | * | 11/2009 | Junker ...................... E04C 2/12 52/588.1 |

FOREIGN PATENT DOCUMENTS

| KR | 20-2008-0006425 U | 12/2008 |
|---|---|---|
| KR | 10-1195598 B1 | 10/2012 |

\* cited by examiner (a)

(b)

BOARD STRUCTURE FOR MANUFACTURING CONCRETE PRODUCTS

TECHNICAL FIELD

The present invention relates to a board structure for manufacturing concrete products, and in particular to a board structure for manufacturing concrete products wherein a board used to manufacture a concrete product, for example, concrete blocks, paving stones, etc. is formed of an upper layer and a lower layer, and a side support frame connecting the upper layer and the lower layer, so it does not need to manufacture molds for each size, and a portion that receives external weight during the manufacturing of concrete products can be reinforced, thus obtaining substantial strength and lightness, and the manufacturing does not cost a lot while reducing noises during the manufacturing of concrete products.

BACKGROUND ART

In general, boards are used during the manufacturing of concrete products, for example, concrete blocks, concrete curb stones, concrete sidewalk blocks, etc. Such boards are necessary products when it needs to continuously product concrete products in large quantities.

More specifically, the concrete products are manufactured in a state where the boards are disposed integral with the mold during the manufacturing of concrete products. The integrated boards and concrete product are obliged to move through a conveyor to a curing chamber, and the concrete product is cured. The substantially cured concrete product is removed. The boards separated from the concrete product can be used again. The concrete products can be continuously manufactured in large quantities in such a way that the boards circulate again in a concrete product manufacturing machinery system.

The board, which has the above-mentioned roles, can be made of wood, plastic, a material bonded with hetero materials, for example, wood, plastic, etc., and steel. Since the board made of wood or plastic may be easily impaired in its surface, it is disadvantageous that the service life of such a material may be short.

In addition, the board made of wood or plastic has a bad property for vibration transfer to the floor, which may make the density of the concrete product uneven. In case of a steel board, a vibration transfer property is good, but it is too heavy, and raw materials cost a lot, which may lead to increased manufacturing cost, so the price of the finished board may increase. The Korean Patent Registration No. 10-1195598 entitled "A board structure for manufacturing concrete products" invented by the same applicant as the present invention includes, as major components, an upper board, a lower board which is secured to the lower surface of the upper board, a space part formed in the insides of the upper board and the lower board, and a reinforcing member which is inserted in the space part.

It is advantageous that the above-mentioned configuration can make light the entire weight while enhancing structural strength of the board, but it inevitably needs to manufacture the molds for each size of the upper board and the lower board when manufacturing the board due to the intrinsic shapes of the upper board and/or lower board which is formed of an upper layer or lower layer and a bent part, so a lot of initial cost is necessary for manufacturing the boards.

In addition, a tamping work necessarily entails so as to make more tense the filled stuff of the concrete during the manufacturing of concrete products. In case of the conventional board structure, a lot of noises occurs during the tamping work.

DISCLOSURE OF THE INVENTION

Accordingly, the present invention is made to improve the above-mentioned problems. It is an object of the present invention to provide a board structure for manufacturing concrete products wherein a board used to manufacture a concrete product is formed of an upper layer and a lower layer, and a side support frame connecting the upper layer and the lower layer, so it does not need to manufacture molds for each size, thus saving manufacturing cost.

It is another object of the present invention to provide a board structure for manufacturing concrete products wherein a portion that receives external weight during the manufacturing of concrete products can be reinforced, thus obtaining substantial strength and lightness.

It is further another object of the present invention to provide a board structure for manufacturing concrete products wherein acoustic absorbent is filled in a space part formed in the inside of a board, thus reducing the noises which occur during the manufacturing of concrete products.

It is still further another object of the present invention to provide a board structure for manufacturing concrete products wherein a vibration member is inserted in a space part formed in the inside of a board, thus enhancing vibration transfer performance during the manufacturing of concrete products.

To achieve the above objects, there is provided a board structure for manufacturing concrete products, which may include an upper layer and a lower layer which are formed in plane shapes; and a side support frame which is disposed between the upper layer and the lower layer and is secured to the rim portions of the upper layer and the lower layer.

To achieve the above objects, there is provided a board structure for manufacturing concrete products, which may include an upper layer which is formed in a plane shape; and a lower body which is formed of a lower layer which is formed in a plane shape; and a side support frame which is bent upward at a rim portion of the lower layer, the lower body being secured to the lower surface of the upper layer.

In addition, it is characterized in that a vibration member for spreading vibrations which occur during the manufacturing of concrete products is inserted in between the upper layer and the lower layer.

Here, it is characterized in that the vibration member is formed in a protrusion structure wherein a ⊓-shaped portion and a ⊔-shaped portion come into close contact with the lower layer and the upper layer, respectively.

In addition, it is characterized in that a protrusion-shaped first furring bamboo part is formed in a longitudinal direction at the upper surface or the lower surface of the vibration member.

Furthermore, it is characterized in that a protrusion-shaped second furring bamboo part is formed in upward and downward directions at a side surface of the vibration member.

In addition, it is characterized in that the vibration member is divided into a plurality of parts.

In addition, it is characterized in that the vibration member is formed in an I-beam shape which is formed of a horizontal surface and a vertical surface.

At this time, a bent part is formed at an end portion of each of both sides of the horizontal surface In addition, it is characterized in that a furring bamboo part is formed in a longitudinal direction or upward and downward directions at the vertical surface.

Meanwhile, it is characterized in that the side support frame is formed in a plate shape.

In addition, it is characterized in that the side support frame is formed in a quadrangular pipe shape.

At this time, it is characterized in that the quadrangular pipe-shaped side support frame is formed in a structure with two and more than two folds.

In addition, it is characterized in that the cross section of the side support frame is formed in a ⊏-shape.

At this time, it is characterized in that a protrusion-shaped furring bamboo part is formed in a longitudinal direction at the vertical surface of the ⊏-shaped side support frame.

In addition, the cross section of the side support frame is formed in a H shape.

In addition, it is characterized in that one or more than one reinforcing members are disposed between the upper layer and the lower layer.

Furthermore, it is characterized in that a stacking rod for stacking the boards is formed integral at each corner portion of the side support frame.

In addition, it is characterized in that a leg member is installed at a side portion of the side support frame or at a lower surface of the lower layer.

At this time, it is characterized in that the leg member is installed detachable by an engaging means.

In addition, it is characterized in that an acoustic absorbent is filled between the upper layer and the lower layer.

At this time, it is characterized in that the acoustic absorbent is filled at an edge portion between the upper layer and the lower layer.

In addition, it is characterized in that the upper layer, the lower layer, the side support frame or the upper layer and the lower body are made of a weather resistance steel plate or a steel plate on the surface of which a corrosion resistance is processed.

In addition, it is characterized in that the side support frame includes a first side support frame which has an engaging groove at an end portion of each of both sides thereof; and a second side support frame wherein an engaging protrusion inserted into the engaging groove protrudes from an end portion of each of both sides thereof.

ADVANTAGEOUS EFFECTS

According to the present invention, a board used to manufacture a concrete product is formed of an upper layer and a lower layer, and a side support frame, so it does not need to manufacture molds for each size, thus saving manufacturing cost. A portion that receives external weight during the manufacturing of concrete products can be reinforced, thus obtaining substantial strength and lightness, while saving a lot of manufacturing costs.

Furthermore, according to the present invention, vibration transfer performance can be enhanced during the manufacturing of concrete products by inserting a vibration member in a space part formed in the inside of the board. Durability can be increased by preventing any sagging phenomenon of the board with the aid of a vibration member and a reinforcing member which are inserted into between the upper layer and the lower layer.

According to the present invention, acoustic absorbent is filled in a space part formed in the inside of the board, thus reducing the noises which occur during the manufacturing of concrete products, which results in improved working environment.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

The exemplary embodiments of the board structure for manufacturing concrete products will be described with reference to the accompanying drawings.

Figure 1:
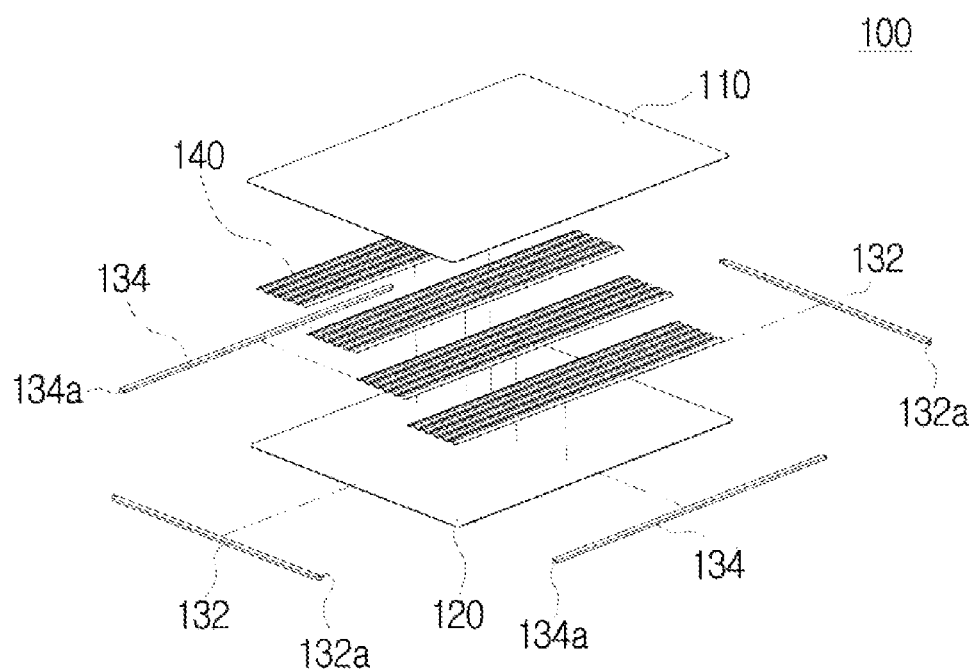
FIG. 1 is a separated perspective view illustrating a board structure for manufacturing concrete products according to a first exemplary embodiment of the present invention.
Figure 2:
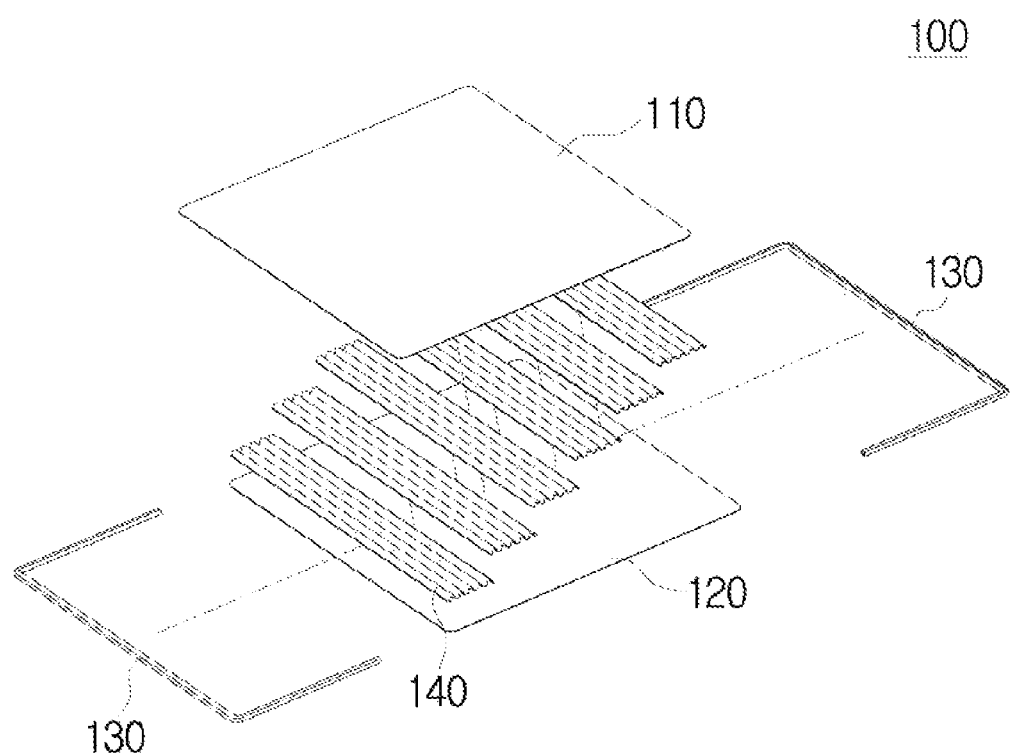
FIG. 2 is a separated perspective view illustrating a side support frame in FIG. 1 according to another exemplary embodiment of the present invention.
Figure 3:
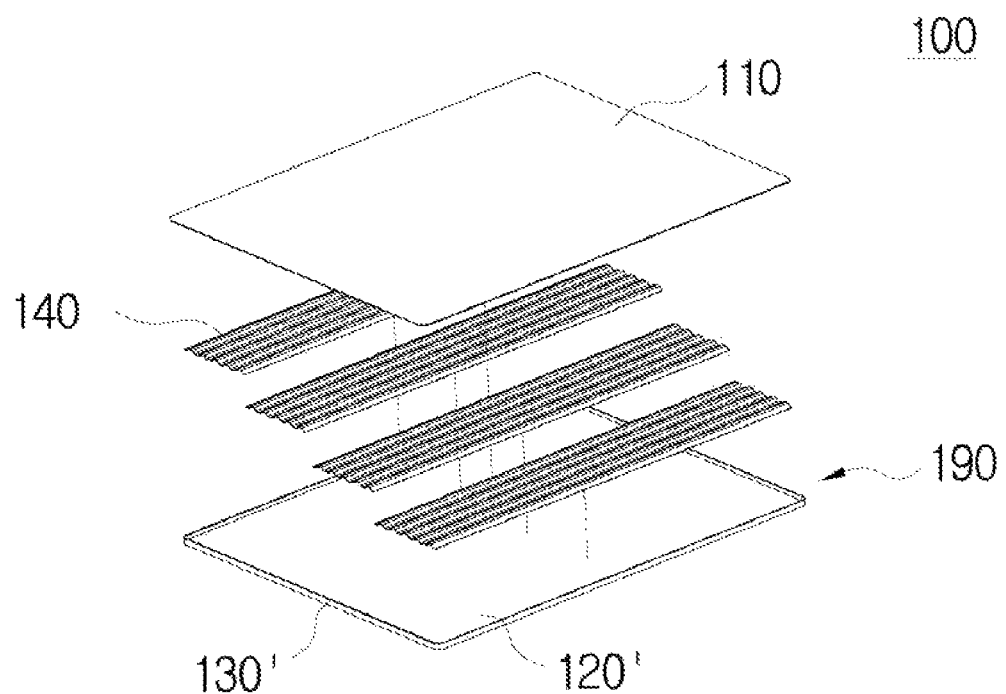
FIG. 3 is a separated perspective view illustrating a board structure for manufacturing concrete products according to a second exemplary embodiment of the present invention.
Figure 4:
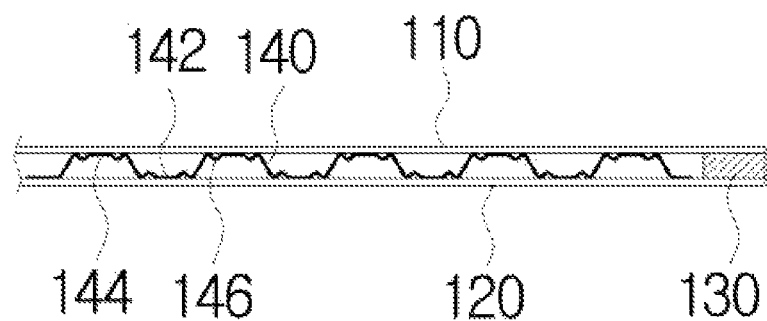
FIG. 4 is a partial side cross sectional view illustrating the configuration in FIG. 1 according to the present invention.
Figure 5:
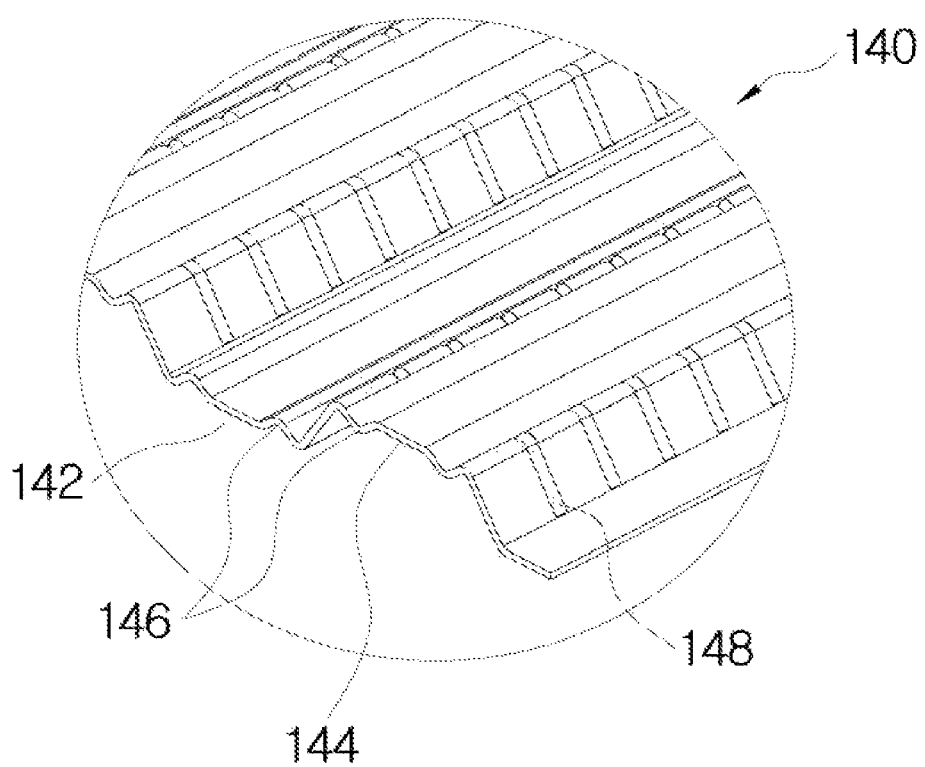
FIG. 5 is a partial perspective view illustrating a vibration member in FIG. 1 according to the present invention.
Figure 6A:
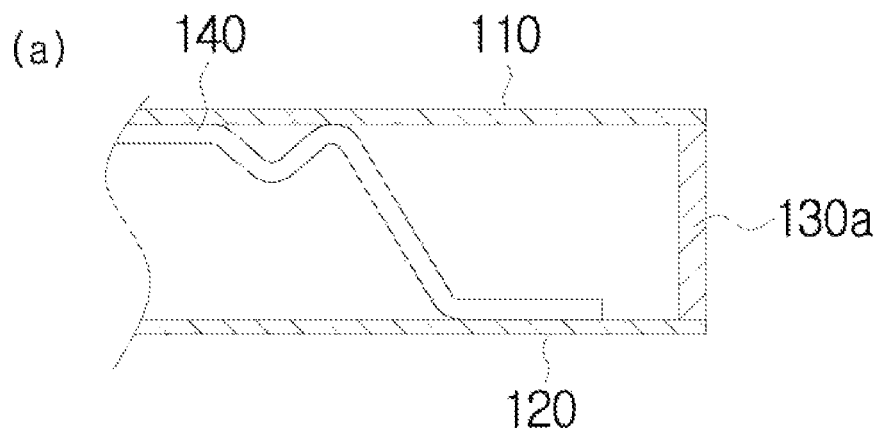
FIGS. 6A, 6B, 6C and 6D are side cross sectional views illustrating various variants of a side support frame in FIG. 1 according to the present invention.
Figure 6B:
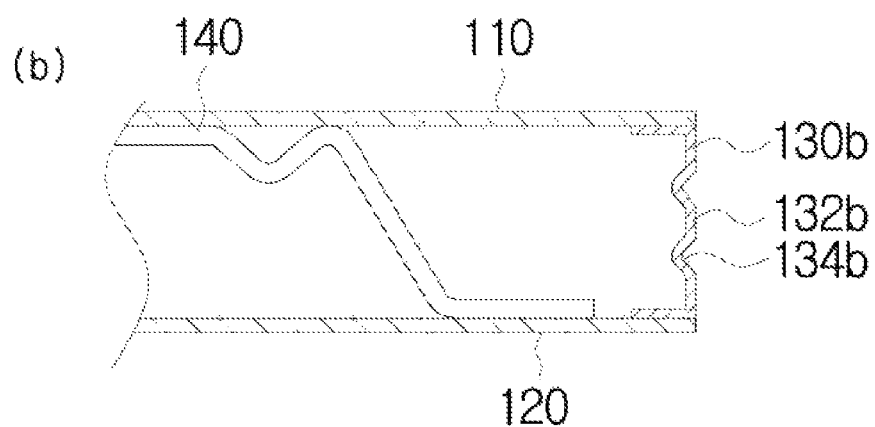
Figure 6C:
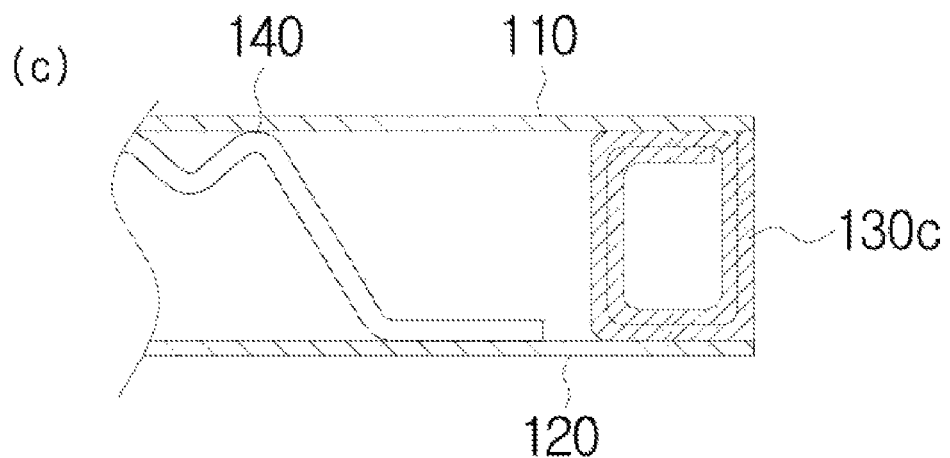
Figure 6D:
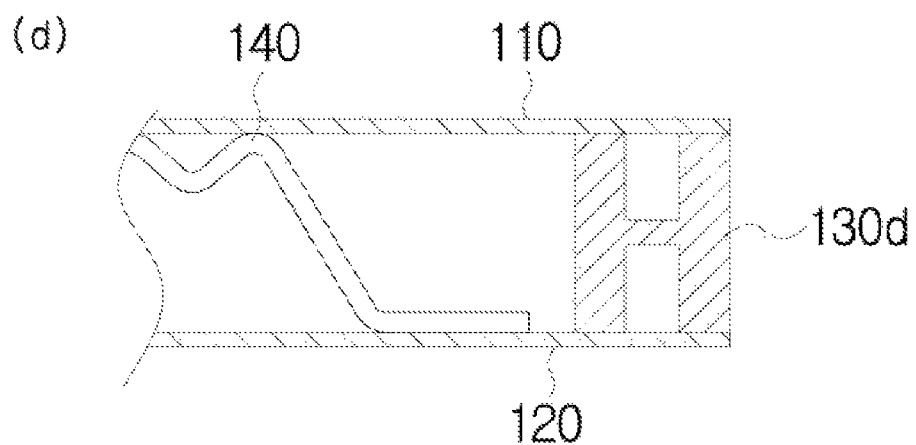
Figure 7:
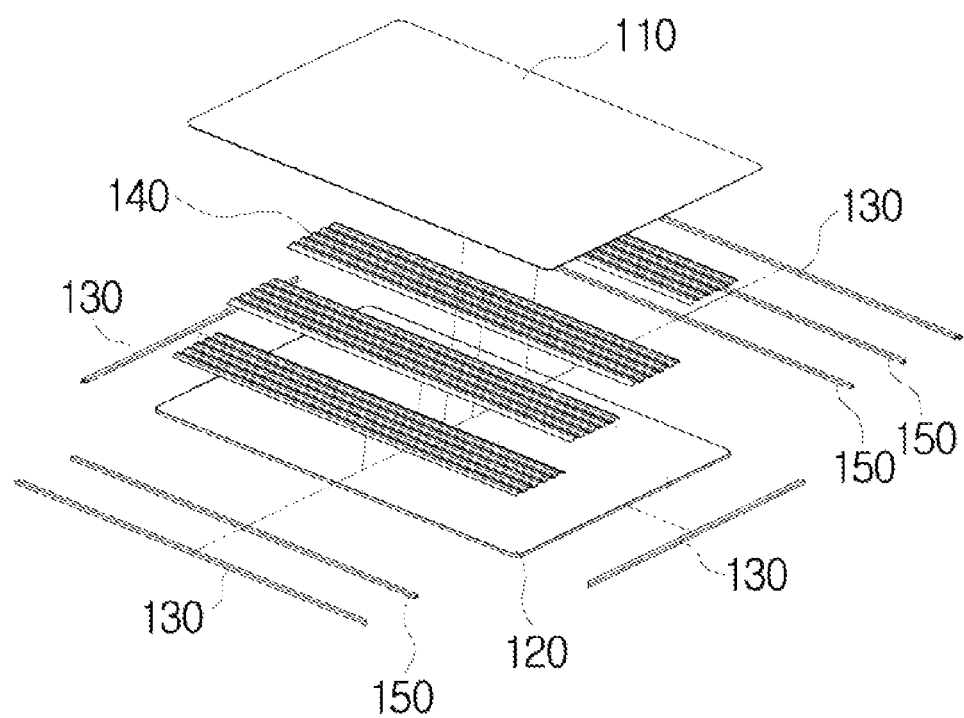
FIG. 7 is a separated perspective view illustrating a board structure for manufacturing concrete products according to a third exemplary embodiment of the present invention.
Figure 8A:
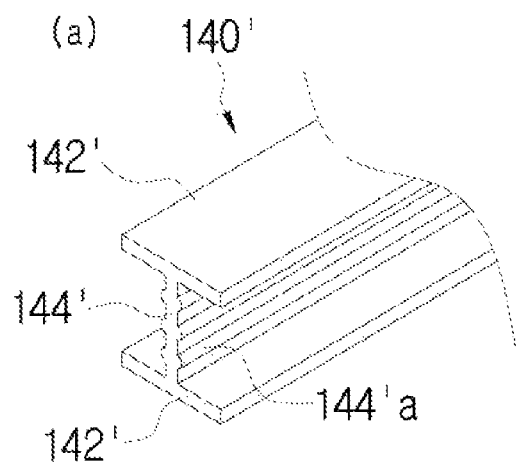
FIGS. 8A, 8B, 8C and 8D are side cross sectional views illustrating various variants of a vibration member of a board structure for manufacturing concrete products according to the present invention.
Figure 8B:
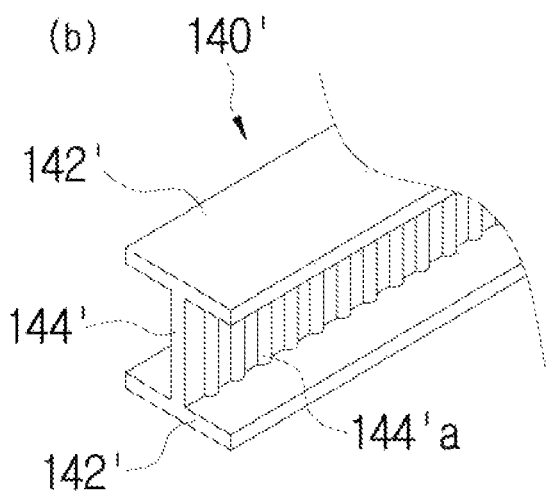
Figure 8C:
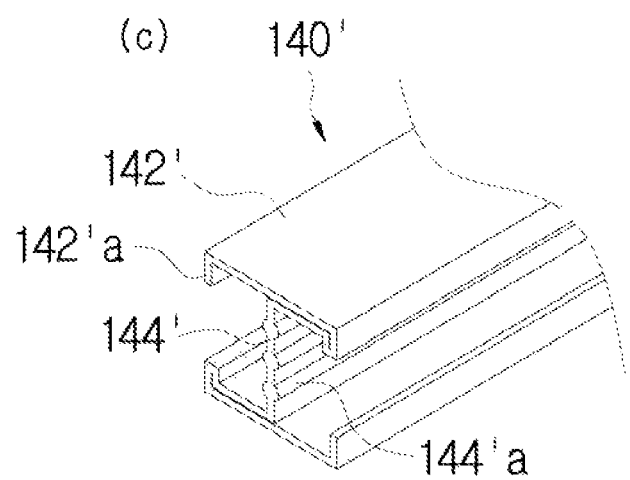
Figure 8D:
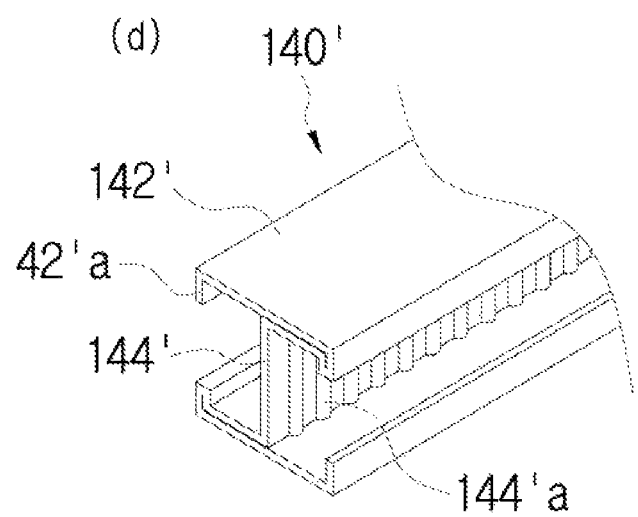
Figure 9A:
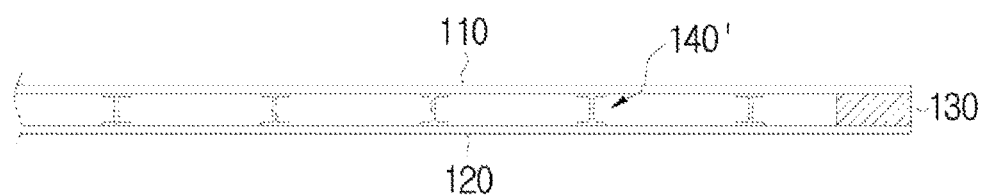
FIGS. 9A and 9B are partial side cross sectional views illustrating a board structure for manufacturing concrete products, wherein a vibration member in FIG. 8 is used according to the present invention.
Figure 9B:
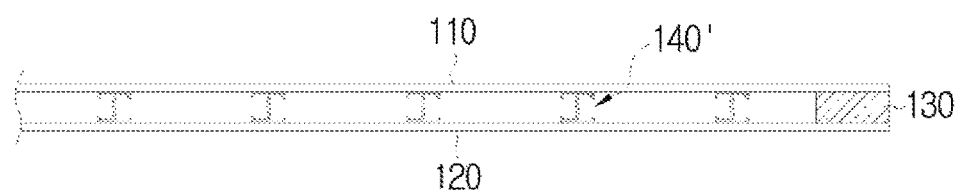
Figure 10:
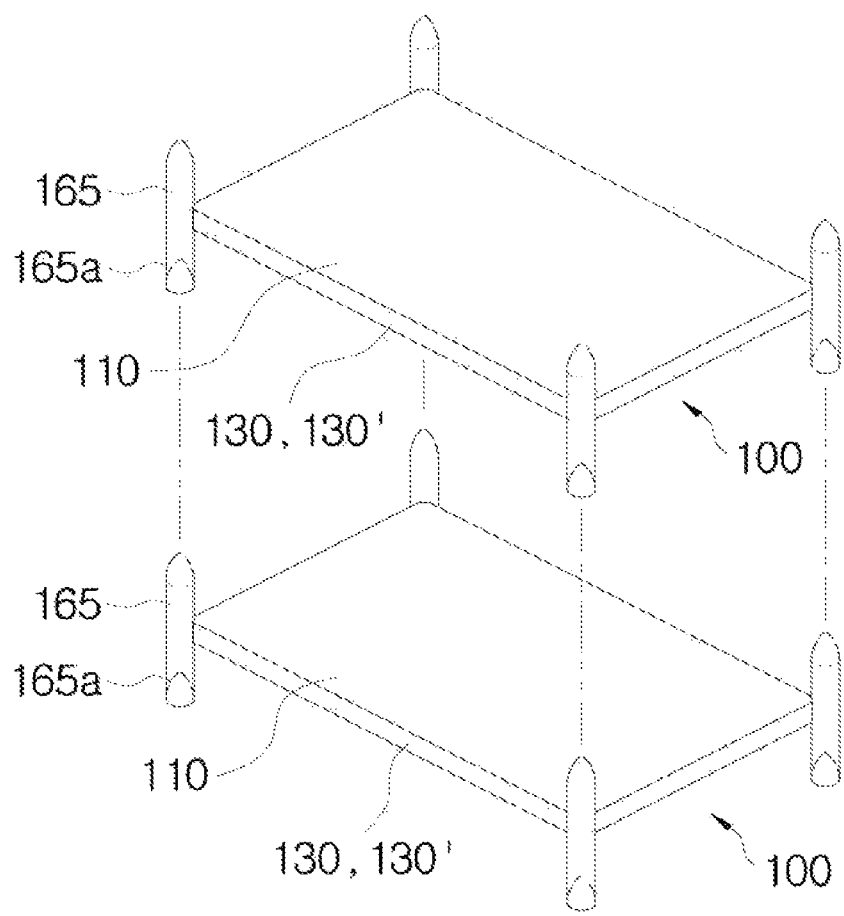
FIG. 10 is a perspective view illustrating a board structure for manufacturing concrete products according to a fourth exemplary embodiment of the present invention.
Figure 11:
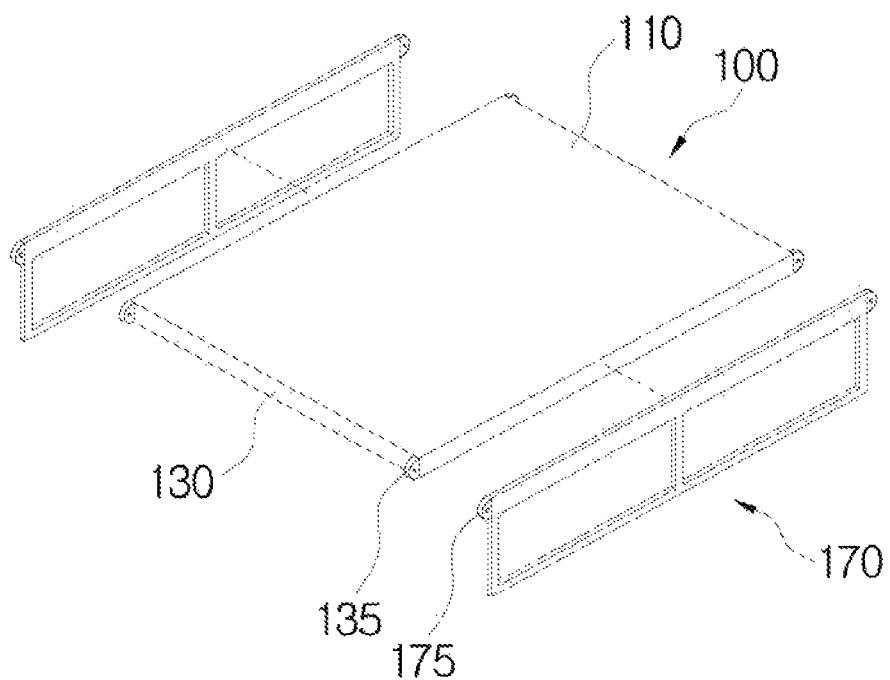
FIG. 11 is a perspective view illustrating a board structure for manufacturing concrete products according to a fifth exemplary embodiment of the present invention.
Figure 12:
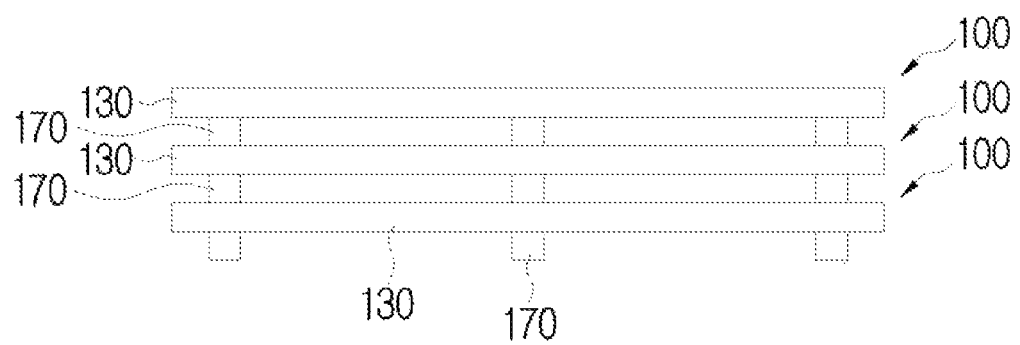
FIG. 12 is a perspective view illustrating a board structure for manufacturing concrete products according to a sixth exemplary embodiment of the present invention.
Figure 13A:
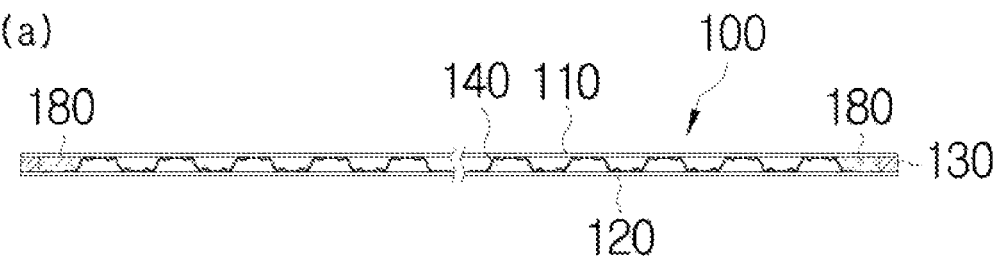
FIGS. 13A, 13B and 13C are partial cross sectional views illustrating a state where an acoustic absorbent is filled inside a board structure for manufacturing concrete products according to the present invention.
Figure 13B:
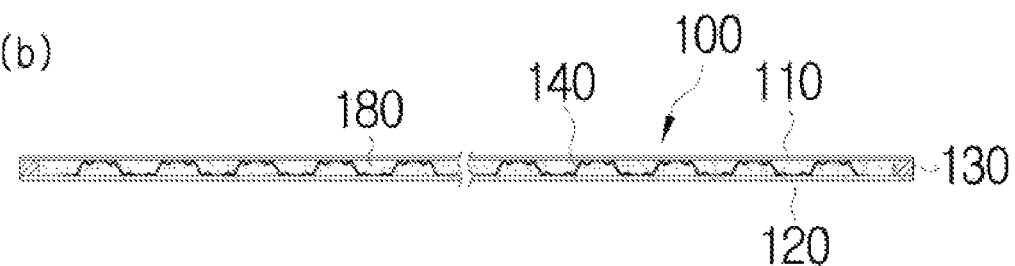
Figure 13C:
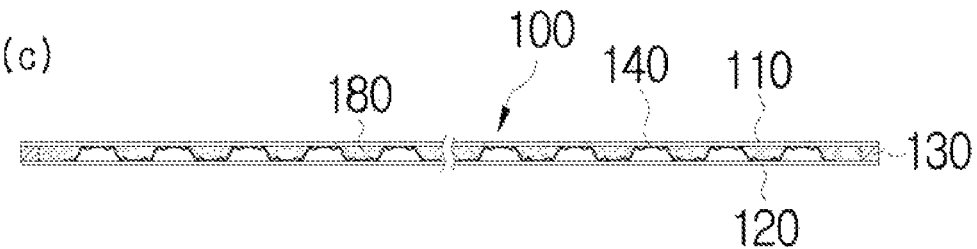

FIG. 1 is a separated perspective view illustrating a board structure for manufacturing concrete products according to a first exemplary embodiment of the present invention, FIG. 2 is a separated perspective view illustrating a side support frame in FIG. 1 according to another exemplary embodiment of the present invention, FIG. 3 is a separated perspective view illustrating a board structure for manufacturing concrete products according to a second exemplary embodiment of the present invention, FIG. 4 is a partial side cross sectional view illustrating the configuration in FIG. 1 according to the present invention, FIG. 5 is a partial perspective view illustrating a vibration member in FIG. 1 according to the present invention, FIGS. 6A, 6B, 6C and 6D are side cross sectional views illustrating various variants of a side support frame in FIG. 1 according to the present invention, FIG. 7 is a separated perspective view illustrating a board structure for manufacturing concrete products according to a third exemplary embodiment of the present invention, FIGS. 8A, 8B, 8C and 8D are side cross sectional views illustrating various variants of a vibration member of a board structure for manufacturing concrete products according to the present invention, FIGS. 9A and 9B are partial side cross sectional views illustrating a board structure for manufacturing concrete products, wherein a vibration member in FIG. 8 is used according to the present invention, FIG. 10 is a perspective view illustrating a board structure for manufacturing concrete products according to a fourth exemplary embodiment of the present invention, FIG. 11 is a perspective view illustrating a board structure for manufacturing concrete products according to a fifth exemplary embodiment of the present invention, FIG. 12 is a perspective view illustrating a board structure for manufacturing concrete products according to a sixth exemplary embodiment of the present invention, and FIGS. 13A, 13B and 13C are partial cross sectional views illustrating a state where an acoustic absorbent is filled inside a board structure for manufacturing concrete products according to the present invention.

The present invention is directed to a board 100 for manufacturing concrete products wherein a board structure used to manufacture a concrete product is formed of an upper layer and a lower layer, and a side support frame connecting the upper layer and the lower layer, so it does not need to manufacture molds for each size, and a portion that receives external weight during the manufacturing of concrete products can be reinforced, thus obtaining substantial strength and lightness, so it is possible to save the cost for manufacturing boards. In addition, noises which occur during the manufacturing of concrete products can be reduced. As illustrated in FIG. 1, the board may include an upper layer 110, a lower layer 120 and a side support frame 130 connecting the upper layer 110 and the lower layer 120.

More specifically, the upper layer 110 is formed in a plane shape on which a concrete product can be manufactured and cured, and the lower layer 120 is formed in a plane shape for maintaining the board 100 horizontal so that the board 100 does not incline during the manufacturing and curing of the concrete product. The side support frame 130 is configured to connect the rim portions between the upper layer 110 and the lower layer 120, while serving to support the entire weight of the concrete product which is being manufactured, transferred and cured on the upper side of the upper layer 110.

Since the conventional board in general is constructed in a box shape wherein the upper layer, the lower layer and the side support frame are formed integral or the upper layer and the lower layer are separated, so the upper layer or the lower layer is inserted in the inside of the lower layer or the upper layer. For this reason, it needs to separately manufacture molds for each size when manufacturing the board 100 having various sizes. Different from the above conventional board structure, the upper layer 10, the lower layer 120 and the side support frame 130 all belonging to the board 100 of the present invention are separately provided, so the board 100 can be manufactured through only a sheet metal working (cutting) and a bonding process, for example, a welding process, etc., which can allow to quickly manufacture the boards in various sizes at lower costs.

At this time, the side support frame 130 may be formed of a pair of first side support frame members 132 secured to a rim portion of a horizontal direction (or vertical direction) of the board 100, and a pair of second side support frame members 134 secured to a rim portion of a vertical direction (or horizontal direction) of the board 100, wherein the first side support frame members 132 and the second side support frame members 134 are separate. An engaging groove 132a is formed at an end portion of each of both sides of the first side support frame members 132, and an engaging protrusion 134a intended to be inserted in the engaging groove 132a protrudes from an end portion of each of both sides of the second side support frame members 134, so the second side support frame members 134 can be inserted into and between the first side support frame members 132.

Not illustrated in the drawings, an engaging groove 132a may be additionally formed at an intermediate portion of the first side support frame members 132. The second side support frame members 134 may be disposed between the upper layer 110 and the lower layer 120 by additionally securing to the thusly formed engaging groove 132a the second side support frame members 134 at both ends of which the engaging protrusion 134a is formed, thus supporting the upper layer 110.

In addition, as illustrated in FIG. 2, the side support frame 130 may be integrally formed in a ⊏-shape or a ロ-shape, thus engaging the upper layer 110 and the second layer 120.

Meanwhile, as illustrated in FIGS. 6A, 6B, 6C and 6D, the side support frame 130 may have various cross section shapes. First, as illustrated in FIG. 6A, the side support frame 130a may be formed in a plate shape with a predetermined thickness and may be engaged between the upper layer 110 and the lower layer 120.

Next, as illustrated in FIG. 6B, the side support frame 130 may be formed in a frame shape with a ≤-shaped cross section. The side support frame 130b with the ≤-shaped cross section may be engaged between the upper layer 110 and the lower layer 120, wherein the vertical surface 132b faces outward.

At this time, at least one furring bamboo part 134b may be formed in a longitudinal direction on the vertical surface 132b of the ≤-shaped side support frame 130b. The furring bamboo part 134b is formed in a protruded shape, thus reinforcing the support force of the side support frame 130b.

Next, as illustrated in FIG. 6C, the side surface frame 130c may be formed in a quadrangular pipe shape. At this time, the quadrangular pipe may be formed in a structure with two or more than two folds, thus maximizing the support force of the side support frame 130c.

As illustrated in FIG. 6D, the side support frame 130d may have a H-shaped cross section. In this case, an acoustic absorbent 180 may be filled in a space part formed at the side support frame 130d.

In addition, the side support frame 130d with a H-shaped cross section may be formed in a structure with more than two or more than two folds or a furring bamboo part may be formed at a vertical portion, thus enhancing supporting force.

At this time, the side support frame 130d with a H-shaped cross section is secured by a welding method between the upper layer 110 and the lower layer 120. A front side of an outer vertical surface between two vertical surfaces belonging to the side support frame 130d is welded by a welding method, and an inner vertical surface is welded at multiple points at regular intervals by a spot welding method, so the upper layer 110, the lower layer 120 and the side support frame 130d are integrated, thus maximizing the supporting force of the side support frame 130d.

Meanwhile, in the board 100 for manufacturing concrete products according to a second exemplary embodiment of the present invention, as illustrated in FIG. 3, the board 100 may be formed of an upper layer 110 and a lower body 190. At this time, the lower body 190 is characterized in that the lower layer 120' and the side support frame 130' are formed integrated.

More specifically, the lower body 190 wherein the lower layer 120' formed in a plane shape by a press drawing method and the side support frame 130' bent upwardly at a rim portion of the lower layer 120' are integrated, is manufactured and secured to the lower surface of the upper layer 110, so it can be possible to manufacture a board 100 in such a way that the welding process, for example, a welding working, etc. is simplified.

Meanwhile, a vibration member 140 may be inserted between the upper layer 110 and the lower layer 120 (hereinafter, it should be understood that the lower layers 120 and 120' include the lower layer 120' of the lower body 190). Here, the vibration member 140 serves to increase the transfer performance of vibrations which occur during the manufacturing of concrete products, thus producing the concrete products which have uniform density.

More specifically, the board 100 according to the present invention vibrates integrally with the mold during the manufacturing of concrete products. In case where the board 100 absorbs the vibrations of mold, the density of the concrete product on the board 100 may become uneven, for which fraction defective may increase. For this reason, the vibration member 140 is inserted between the upper layer 110 and the lower layer 120, 120' in order to allow the vibrations of the mold to spread evenly to the concrete product, thus producing concrete products having uniform density.

At this time, the vibration member 140 is installed in such a way that the upper layer 110 and the lower layer 120, 120' contact with each other with no any gaps between them for the sake of efficient transfer of vibrations. More specifically, the vibration member 140 is formed in a protrusion structure wherein a side surface thereof has a predetermined slope, so the lower surface of a ⊓-shaped negative protrusion portion 142 can come into close contact with the upper surface of the lower layer 120, 120', and the upper surface of the ⊔-shaped positive protrusion portion 144 can adhere to the lower surface of the upper layer 110.

Namely, the vibration member 140 aims to uniformly spread the vibrations of the mold which occur during the manufacturing of concrete products, so the negative and position protrusion structure may allow the upper layer 110 and the lower layer 120, 120' to contact with each other evenly, thus minimizing the entire weight of the board 100.

In addition, as illustrated in FIG. 5, a protrusion-shaped first furring bamboo part 146 may be formed in a longitudinal direction at a lower surface of the negative protrusion 142 of the vibration member 140 and at an upper surface of the positive protrusion 144 thereof. Here, the first furring bamboo part 146 serves to enhance the strength in the longitudinal direction of the vibration member 140, thus preventing any deformation of the vibration member 140 and enhancing the transfer force of vibrations.

In addition, a negative protrusion-shaped second furring bamboo part 148 may b formed in the upward and downward directions at the side surface of the vibration member 140. The second furring bamboo part 148 serves to enhance the strength of the side surface of the vibration member 140, thus preventing any deformation of the vibration member 140, so any sagging phenomenon at the upper layer 110 due to the entire weight of the concrete product can be prevented, while enhancing the transfer force of vibrations.

In addition, the vibration member 140 may be installed in a form of one piece between the upper layer 110 and the lower layer 120, 120', however it is preferred that such a vibration member 140 may be divided into multiple parts for the sake of the insertion of the reinforcing member 150, while reducing the entire weight of the board 100.

Meanwhile, according to another exemplary embodiment of the present invention, as illustrated in FIGS. 8A to 8D, an I-beam shaped vibration member 140' may be used. It is advantageous that the I-beam shaped vibration member 140' can be easily manufactured.

More specifically, the I-beam shaped vibration member 140' is formed o a horizontal surface 142' contacting with the lower surface of the upper layer 110 and the upper surface of the lower layer 120, 120', respectively, and a vertical surface 144' connected between the horizontal surfaces 142'. With such a configuration, it is possible to evenly spread the vibrations occurring at the mold during the manufacturing of concrete products to the board 100.

At this time, the furring bamboo part 144'a is formed in the longitudinal direction or the upward or downward direction at the vertical surface 144', so the strength in the longitudinal direction or upward or downward direction of the vibration member 140' can be enhanced, wherein it could say that the vibration member 140' may play a role as a reinforcing member 150 which will be described later.

In addition, a bent part 142' a which is bent upward in a vertical direction may be formed at an end portion of each of both sides of the horizontal surface 142', so it is possible to enhance supporting force with respect to the weight in the vertical direction which occurs due to concrete product.

In addition, part or the whole parts of the horizontal surface 142' or the vertical surface 144' may be formed in a structure with two or more than two folds in the way of bending a steel plate which forms the I-beam shaped vibration member 140' in order to enhance the supporting force and transfer force of the vibrations of the vibration member 140'.

Next, in the board 100 for manufacturing concrete products according to a third exemplary embodiment of the present invention, as illustrated in FIG. 7, the board 100 may further include a reinforcing member 150. The reinforcing member 150 is inserted between the upper layer 110 and the lower layer 120, 120' so as to support the upper layer 110, thus allowing to prevent any sagging phenomenon due to the entire weight of the concrete product during the manufacturing, transfer and curing of the concrete products.

More specifically, in case where any sagging phenomenon occurs at the board 100, it is may be impossible to manufacture the concrete product in a desired shape, and the transferring performance of vibrations may degrade, which may result in uneven density of the concrete product. For this reason, the reinforcing member 150 is inserted between the upper layer 110 and the lower layer 120, 120' in order to support the lower surface of the upper layer 110, thus enhancing durability by preventing the sagging phenomenon of the board 100.

At this time, the reinforcing member 150 may be formed in various shapes including a quadrangular pipe shape. It is obvious that the reinforcing member 150 may be formed in a structure with two or more than two folds depending on the size of the concrete product which is indented to be manufactured or the reinforcing member may be inserted between the upper layer 110 and the lower layer 120, 120' in the various variants of the side support frame 130 wherein the furring bamboo part is formed at a side surface.

In addition, the installation position and number of the reinforcing members 150 may change depending on the size or weight of the concrete product which is intended to be manufactured, and the reinforcing member 150 is mainly installed at a portion contacting with the mold during the manufacturing of the concrete product, thus preventing any deformation of the board.

Meanwhile, the board 100 for manufacturing concrete products according to the present invention is adhered by welding the upper layer 110, the lower layer 120, the side support frame 130, the vibration member 140 and the reinforcing member 150 or the upper layer 110, the lower body 190, the vibration member 140 and the reinforcing member 150. At this time, it is preferred that the welding method intended to be used is a mother material-melting type welding method wherein components are adhered without using any medium like a welding rod, so the whole portions of the board 100 can be adhered integral, thus manufacturing the board 100 which is strong and has good transfer performance of vibrations.

In addition, the materials of the upper layer 110, the lower layer 120, the side support frame 130 and the lower body 190 which all define the outer configuration of the board 100 according to the present invention are weather resistance steel plate. The weather resistance steel plate is a steel plate which has good corrosion resistance as compared with common steel in such a way to add alloy compositions, for example, Cu, Cr, Ni, etc. which in general are not contained in the common steel. Since the weather resistance steel plate does not corrode well in the air, so the service life, namely, durability of the board 100 can be strong.

In addition, a water resistance agent may be coated on the surface of the weather resistance steel plate or a corrosion resistance agent may be coated thereon in order to prevent moisture from coming in the inside of the board 100, and any oxidation of the board 100 may be prevented, thus more enhancing the durability of the board 100.

Next, in the board 100 for manufacturing concrete products according to fourth exemplary embodiment of the present invention, as illustrated in FIG. 10, a stacking rod 165 may be formed integral at each corner of the side support frame 130, 130' for the sake of the stacking of the boards 100. At this time, the top of the stacking rod 165 may be tipped, and at the bottom of the stacking rod 165, an insertion groove 165a may be formed to receive the top of the stacking rod 165. With this configuration, it is possible to stack the boards 100 without disposing any other components, for example, an engaging member, etc.

As not illustrated in the drawings, it is obvious that the stacking rods 165 may be detachably secured to the board by using a predetermined fixing member, for example, a clamp, etc.

Meanwhile, in the board 100 for manufacturing concrete products according to a fifth exemplary embodiment of the present invention, there may be further provided a leg member 170 which is intended to be installed at a side portion of the side support frame 130, 130'. The leg member 170 is provided for the sake of the stacking of the board 100.

At this time, as illustrated in FIG. 11, engaging member 135 and 175 may be formed at the side support frame 130, 130' and the leg member 170, respectively in order to detachably secure the leg member to the side support frame 130, 130' using an engaging member, for example, a bolt, etc.

In addition, as illustrated in FIG. 12, the leg member 170 may be installed at the lower side of the lower layer 120, 120'. In this case, it is obvious that the leg member 170 may be detachably secured with the aid of an engaging member by forming an additional engaging member (not shown) at the lower plate 120, 120' and the leg member 170.

Meanwhile, the acoustic absorbent 180 may be filled in the space part formed between the upper layer 110 and the lower plate 120, 120'. Here, the absorbent 180 serves to reduce the vibration noises which occur during the manufacturing of concrete products in the molds.

In other words, since the vibration noises which occur at the board 100 during the manufacturing of concrete product cause problems with working environment, the acoustic absorbent 180 is filled in between the upper layer 10 and the lower layer 120, 120' in an effort to improve such problems, thus reducing the vibration noises which occur at the board 100.

At this time, it is obvious that the acoustic absorbent 180 can be made of various materials, for example, sawdust, sand, etc. which is lighter than the material of the rubber or synthetic resin (board 100).

In addition, as illustrated in FIG. 13B, the acoustic absorbent may be filled into the whole portions of the space part formed between the upper layer 110 and the lower layer 120, 120' or the acoustic absorbent may be filled into only an edge portion of the board 100 where the vibration noises occur most, as illustrated in FIG. 13A, so as to make the board 100 lighter. Alternatively, as illustrated in FIG. 13C, the acoustic absorbent 180 may be partially filled into the whole portions of the space part formed between the upper layer 110 and the lower layer 120, 120'.

Therefore, in the board 100 for manufacturing concrete products according to the present invention, the board 100 may be formed of the upper layer, the lower layer and the side frame, so it does not need to manufacture molds for each size, and a portion that receives weight during the manufacturing of concrete products can be reinforced, thus maintaining strength, and a space part may be formed between the upper layer 110 and the lower layer 120, 120', which can result in lightness, while saving manufacturing cost. The vibration member 140 may be inserted in the space part formed within, so the transfer performance of vibrations can be enhanced during the manufacturing of concrete products. The acoustic absorbent 180 may be filled in the space part formed in the inside of the board 100, thus reducing the noises which occur at the board 100 during the manufacturing of concrete products. Therefore, the present invention can provide various advantages.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

INDUSTRIAL APPLICABILITY

The present invention is directed to a board structure for manufacturing concrete products, and in particular to a board structure for manufacturing concrete products wherein a board used to manufacture a concrete product, for example, concrete blocks, paving stones, etc. is formed of an upper layer and a lower layer, and a side support frame connecting the upper layer and the lower layer, so it does not need to manufacture molds for each size, and a portion that receives external weight during the manufacturing of concrete products can be reinforced, thus obtaining substantial strength and lightness, and the manufacturing does not cost a lot while reducing noises during the manufacturing of concrete products.

What is claimed is:

1. A board structure for manufacturing concrete products, comprising:
   an upper layer and a lower layer which are formed in rectangular plane shapes;
   a side support frame disposed between the upper layer and the lower layer along four sides thereof and supporting the upper layer and the lower layer at rim portions, the side support frame including
   first side support frame members disposed at lengthwise sides of the upper layer and the lower layer, and
   second side support frame members disposed at widthwise sides of the upper layer and the lower layer;
   and a vibration member disposed between the upper layer and the lower layer and formed unitarily in an I-beam shape which has an upper horizontal flange, a lower horizontal flange and a vertical web, the vibration member having a plurality of furring bamboo parts formed in upward and downward directions with a regular interval on a lateral surface of the vertical web such that one end of each of the furring bamboo parts supports the upper horizontal flange and the other end of said each of the furring bamboo parts supports the lower horizontal flange, wherein the vibration member is configured to spread vibrations which occur during the manufacturing of concrete products.

2. The board structure of claim 1, wherein the vibration member further includes bent parts which are formed at opposing ends of the upper and lower horizontal flanges such that first bent parts formed in the upper horizontal flange and second bent parts formed in the lower horizontal flange are facing with each other.

3. The board structure of claim 1, wherein the side support frame comprises a plate.

4. The board structure of claim 1, wherein the side support frame is formed in a quadrangular pipe shape.

5. The board structure of claim 4, wherein the quadrangular pipe-shaped side support frame is formed of a structure with more than two folds.

6. The board structure of claim 1, wherein the cross section of the side support frame is formed as a channel.

7. The board structure of claim 6, wherein a protrusion furring bamboo part is formed in a longitudinal direction at a vertical surface of the channel of the side support frame.

8. The board structure of claim 1, wherein a cross section of the side support frame is formed in an H-shape.

9. The board structure of claim 1, wherein one or more reinforcing members are disposed between the upper layer and the lower layer.

10. The board structure of claim 1, further comprising stacking rods disposed at each corner portion of the board structure for stacking board structures.

11. The board structure of claim 1, wherein a leg member is installed at a side portion of the side support frame or at a lower surface of the lower layer.

12. The board structure of claim 11, wherein the leg member is detachably installed by an engaging member.

13. The board structure of claim 1, wherein an acoustic absorbent is filled between the upper layer and the lower layer.

14. The board structure of claim 13, wherein the acoustic absorbent is filled at an edge portion between the upper layer and the lower layer.

15. The board structure of claim 1, wherein the upper layer, the lower layer, the side support frame are made of a weather resistance steel plate or a steel plate comprising a surface on which a corrosion resistance is processed.

16. The board structure of claim 1, wherein
   the first side support frame members each having an engaging groove at end portions thereof; and
   the second side support frame members each having an engaging protrusion, wherein the engaging protrusion is configured to be inserted into one of the engaging grooves.

* * * * *

UNITED STATES PATENT AND TRADEMARK OFFICE
CERTIFICATE OF CORRECTION

PATENT NO. : 9,757,873 B2
APPLICATION NO. : 14/713392
DATED : September 12, 2017
INVENTOR(S) : Hi-Man Lee Page 1 of 1

It is certified that error appears in the above-identified patent and that said Letters Patent is hereby corrected as shown below:

On the Title Page

Item (71) Applicant should read: SAMJUNG INDUSTRIES CO., LTD., Gyeongsangbuk-do (KR)
Hi-Man Lee, Gyeongsangbuk-do (KR)

Item (72) Inventor should read: Hi-Man Lee, Gyeongsangbuk-do (KR)

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*